United States Patent
Schwartz et al.

(10) Patent No.: US 7,832,004 B2
(45) Date of Patent: Nov. 9, 2010

(54) SECURE PRIVILEGE ELEVATION BY WAY OF SECURE DESKTOP ON COMPUTING DEVICE

(75) Inventors: Jonathan D. Schwartz, Kirkland, WA (US); Eric C. Perlin, Redmond, WA (US); James H. Hong, Seattle, WA (US); Stephen F. Scallen, Sammamish, WA (US); Sermet Iskin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1113 days.

(21) Appl. No.: 11/502,813

(22) Filed: Aug. 10, 2006

(65) Prior Publication Data

US 2008/0040797 A1  Feb. 14, 2008

(51) Int. Cl.
   *G06F 12/00* (2006.01)
(52) U.S. Cl. .................... 726/19; 726/16; 726/17; 713/167; 709/229
(58) Field of Classification Search .............. 726/19, 726/18, 5, 27–30, 16–17; 713/183, 167; 709/229

See application file for complete search history.

(56) References Cited

U.S. PATENT DOCUMENTS

| | | | |
|---|---|---|---|
| 5,606,609 A | 2/1997 | Houser et al. ................. 380/4 |
| 5,664,099 A | 9/1997 | Ozzie et al. ................. 395/186 |
| 6,006,328 A | 12/1999 | Drake ........................ 713/200 |
| 6,091,409 A | 7/2000 | Dickman et al. ............ 345/329 |
| 6,278,448 B1 | 8/2001 | Brown et al. ................ 345/333 |
| 6,542,994 B1 | 4/2003 | Dircks et al. ............... 713/201 |
| 2002/0066039 A1 | 5/2002 | Dent .......................... 713/202 |
| 2003/0159070 A1 | 8/2003 | Mayer et al. ................ 713/201 |
| 2003/0212890 A1 | 11/2003 | Dircks et al. ............... 713/164 |
| 2003/0217287 A1* | 11/2003 | Kruglenko ................. 713/200 |
| 2004/0225877 A1 | 11/2004 | Huang ........................ 713/100 |

(Continued)

FOREIGN PATENT DOCUMENTS

EP   1 420 562 A2   5/2004

OTHER PUBLICATIONS

RealSecure®, Desktop Protector User Guide, Version 3.6, Internet Security Systems™, 118 pages, http://documents.iss.net/literature/RealSecure/RSDP-UG_36.pdf.
Integrity Desktop Manager Guide, Managing Integrity Desktop in the Enterprise, Zone Labs Smarter Security™, Version 4.0, 100 pages, http://www.uic.edu/depts/accc/software/zonelabs/DesktopGuide.pdf.
xSides White Paper, 2002 Doculabs, 19 pages.

*Primary Examiner*—Thanhnga B Truong
(74) *Attorney, Agent, or Firm*—Woodcock Washburn LLP

(57) ABSTRACT

A computing device has a user desktop on which a relatively less-secure user application is executed and a secure desktop elevated from the user desktop on which a relatively more-secure secure application is executed upon a request thereto from the user application. To securely collect information from a user at the computer device with regard to the secure application at the secure desktop, an access interface is securely executed on the secure desktop and is visually presented in conjunction with the requesting user application of the user desktop such that the access interface is visually coupled to the requesting user application and is visually perceived by the user along with such requesting user application.

14 Claims, 4 Drawing Sheets

U.S. PATENT DOCUMENTS

| | | | |
|---|---|---|---|
| 2005/0066202 A1* | 3/2005 | Evans et al. | 713/202 |
| 2005/0091608 A1* | 4/2005 | Gusmorino et al. | 715/801 |
| 2005/0149486 A1* | 7/2005 | Nason et al. | 707/1 |
| 2005/0188210 A1* | 8/2005 | Perlin et al. | 713/183 |
| 2007/0101148 A1* | 5/2007 | Schutz et al. | 713/182 |
| 2007/0101435 A1* | 5/2007 | Konanka et al. | 726/27 |

* cited by examiner

US 7,832,004 B2

SECURE PRIVILEGE ELEVATION BY WAY OF SECURE DESKTOP ON COMPUTING DEVICE

TECHNICAL FIELD

The present invention relates to a computing device having a user desktop as an interface from which user processes are available and a secure desktop that is elevated from the user desktop and from which more secure system processes are available. In particular, the present invention relates to such a method and mechanism by which permission to elevate a privilege is securely obtained from a user by way of the secure desktop such that a nefarious entity cannot improperly persuade a user to elevate the privilege so that the nefarious entity can commit unwanted acts.

BACKGROUND OF THE INVENTION

As may be appreciated, a typical computing device is subject to many security risks including attacks, security breaches, and the like. To at least partially protect against such security risks, methods and mechanisms have been established to impart levels of trust to various computing activities. For example, for a user to perform a relatively sensitive act such as changing a security setting or installing a new trusted root certificate, the user may be required to enter a credential such as a password or the like, where the credential may be employed to identify the user, where the credential may act to confirm that the user in fact requests the operation, and/or where the credential may be employed to confirm that the user in fact has the right to request the operation.

As should be appreciated, then, a nefarious entity without knowledge of such a credential cannot supply same to establish trust at the computing device. However, and significantly, one avenue of attack that may be employed by such a nefarious entity may be to supply an application that tricks or otherwise deceives the user that has knowledge of the credential into supplying same. For example, the application may appear to collect the credential from the user for one purpose but then may instead use the collected credential to effectuate another purpose.

Even if such a credential is not required, the user may be required to confirm a relatively sensitive act by selecting from among options to confirm or deny the operation. Here, and in a similar manner, a nefarious entity may trick or otherwise deceive the user into allowing an operation by displaying the options in an improper manner. For example, the nefarious entity may be able to supply an application that replaces a 'deny' option with a 'confirm' label, and vice versa.

Generally, the root of the problem may be summarized as the inability to distinguish between a lawful application that legitimately prompts the user to perform some relatively sensitive act and a malicious application that illegitimately prompts the user. In particular, a nefarious entity can readily supply such a malicious application that generates a prompt requesting a user to enter a credential to effectuate an operation, to select an option to confirm such an operation, or the like, where the malicious application is constructed to look like and even behave as a legitimate application.

Moreover, in at least some computing architectures, a malicious application can be constructed and operated to monitor and intercept inputs to a legitimate application, including an entered credential or the like. Furthermore, such a malicious application may also programmatically control a legitimate application such that the legitimate application dismisses user confirmation of sensitive acts. In such an instance, it may for example occur that a user supplies changes to the security settings of a legitimate firewall application on a computing device, but that the malicious application programmatically causes the legitimate application to ignore the changes such that the computing device is more vulnerable to attack.

At any rate, one method and mechanism to combat such a malicious application is to supply the computing device with a user desktop that is available to user processes during the normal course of operation of the computing device, and also to supply the computing device with a secure desktop that is 'elevated' from the user desktop in terms of security and from which more secure system processes are available. Notably, such secure desktop only allows an application to be executed therefrom if the application is recognized by the secure desktop as being trustworthy. As may be appreciated, such trustworthiness may be established in any appropriate manner, and may for example comprise the application having a non-revoked digital certificate or other proffering device from a source that is recognized by the secure desktop as being trustworthy. Thus, the secure desktop allows an application to be run thereon only after the application has been established as being trustworthy, and if the trustworthy application satisfies any other policy that the secure desktop enforces. Such a secure desktop is disclosed more fully in U.S. patent application Ser. No. 11/251,946, filed Oct. 17, 2005 and hereby incorporated by reference in its entirety.

Typically, the secure desktop is switched to from the user desktop when the computing device is required to perform a sensitive act. For example, the secure desktop may be called to adjust a privilege for a user or a process or the like. Similarly, the secure desktop may be called to securely confirm a sensitive act, securely input sensitive information, or the like. When a user application or the like calls to perform a sensitive act, the call is either received or intercepted such that the secure desktop performs the sensitive act. In doing so, the secure desktop may require that the user securely confirm performance of the sensitive act, perhaps by way of an entered credential or a confirmatory selection. Only after the user so securely confirms does the secure desktop in fact perform the sensitive act, as may be appreciated. The sensitive act is then performed at the secure desktop by way of a secure application, after which control returns to the user desktop and the user application that initiated the call. Inasmuch as the secure desktop performs the sensitive act by way of a secure application, a malicious entity that presumably cannot supply a secure application cannot trick or otherwise coerce the secure desktop into executing a non-trustworthy illegitimate application to perform a sensitive act.

It is to be appreciated that a desktop does not strictly speaking perform any act. Instead, an application may be executed on a corresponding desktop to perform an act. Of course, the desktop may perform some decision-making with regard to whether an application may execute thereon, and also with regard to specific acts the application may attempt. Generally, only a trustworthy application can execute on the secure desktop to display user interface subject matter in a space where a non-trustworthy user application cannot interfere. Likewise, only the non-trustworthy user application may only execute on the user desktop. Thus, it may be said that a user desktop is a 'container' for non-trustworthy user applications while a secure desktop is a container for a trustworthy secure application.

Inherent in the use of the secure desktop is the concept that the user at the computing device is being asked to make a good decision on when to allow a secure application to perform a sensitive act on the secure desktop. Thus, such user should be presented with an access interface that provides the user with reliable information such that the user can in fact make such a good decision based on the needs of the user and considerations of system protection. Unfortunately, a poor decision may result in the system being corrupted or otherwise left vulnerable to malicious attack by a nefarious entity or the like. Therefore, the access interface must be protected from attack by such a nefarious entity or the like.

However, and significantly, it has been found that the access interface is indeed vulnerable to attack by such a nefarious entity. Specifically, it has been demonstrated that inputs to the access interface can be altered or 'spoofed'. For example, if the access interface includes one or more visual zones or 'buttons' that can be selected by way of a cursor or the like, the cursor can be made to appear to a user as selecting a deny button that denies permission to perform a sensitive act on the secure desktop, when in fact the cursor selects an accept or confirmatory button that allows such sensitive act on such secure desktop.

Thus, a nefarious entity may effectuate a nefarious application at the user desktop of a computing device, where the nefarious application attempts to commit some undesirable act by way of a sensitive act at the secure desktop. In such an instance, the user would typically be prompted on the user desktop to deny or allow such act, recognize that the act should be denied, and thus choose to select the deny button. Notably, though, the nefarious application or a related application can spoof the selection of the deny button on the user desktop to in fact be a selection of the accept button, and thereafter wreak havoc based on the performed sensitive act. For example, if the sensitive act is to elevate a privilege for the nefarious application, the nefarious application could employ the elevated privilege to delete files at the computing device, or even delete an account for the user at the computing device. As may be appreciated, such an attack is a specific example of a more general class of interface spoofing attacks, which are not believed to have a solution within a graphics/display subsystem of a computing device.

Accordingly, a need exists for a method and mechanism to render and present an access interface for obtaining permission to perform a sensitive act at a secure desktop, where the access interface is not susceptible to an interface spoofing attack. In particular, a need exists for a method and mechanism by which the access interface executes on the secure desktop to be presented to the user. Moreover, a need exists for such a method and mechanism whereby the access interface is presented to the user in an aesthetically pleasing and expected manner such that the user is not surprised by the presence of the interface and can be expected to make a good decision regarding whether to allow a secure application to be run at the secure desktop to elevate a privilege.

SUMMARY OF THE INVENTION

The aforementioned need is satisfied by the present invention in which a method is provided with regard to a computing device that has a user desktop for executing a relatively less-secure user application during normal operation of such computing device, and that also has a secure desktop elevated from the user desktop for executing a relatively more-secure secure application upon a request thereto from the user application. In particular, the method is for securely collecting information from a user at the computer device with regard to the secure application at the secure desktop.

In the method, an access interface is securely executed on a secure desktop to securely collect the information from the user. The access interface of the secure desktop is visually presented in conjunction with the requesting user application of the user desktop such that the access interface is visually coupled to the requesting user application and is visually perceived by the user along with such requesting user application.

The request from the user application on the user desktop is received, and in response thereto a background display image is generated to include a visual representation of the user application. Thereafter, the computing device is automatically switched from the user desktop to the secure desktop, and the generated background display image is then employed as a background of the secure desktop on a monitor of the computing device.

Additionally, the access interface is executed on the secure desktop and in conjunction therewith a visual representation of the access interface is securely displayed in a foreground of the secure desktop on the monitor. The visual representation of the access interface includes one or more prompts for securely collecting the information from the user. With the visual representation of the access interface in the foreground of the monitor and the visual representation of the requesting user application in the background display image in the background of the monitor, the access interface is visually coupled to the requesting user application and is visually perceived by the user along with such requesting user application.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
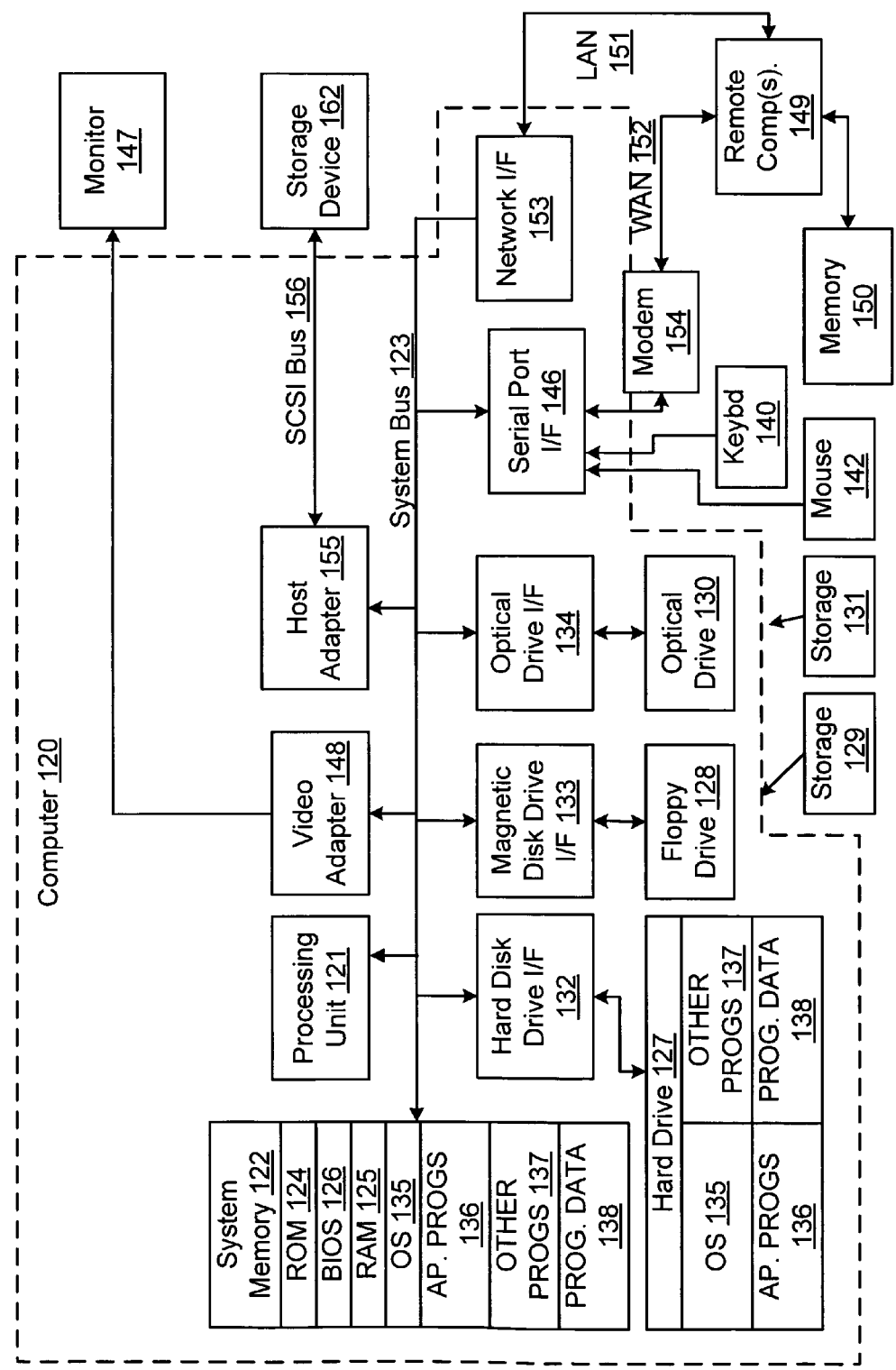
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

User Desktop and Secure Desktop

Figure 2:
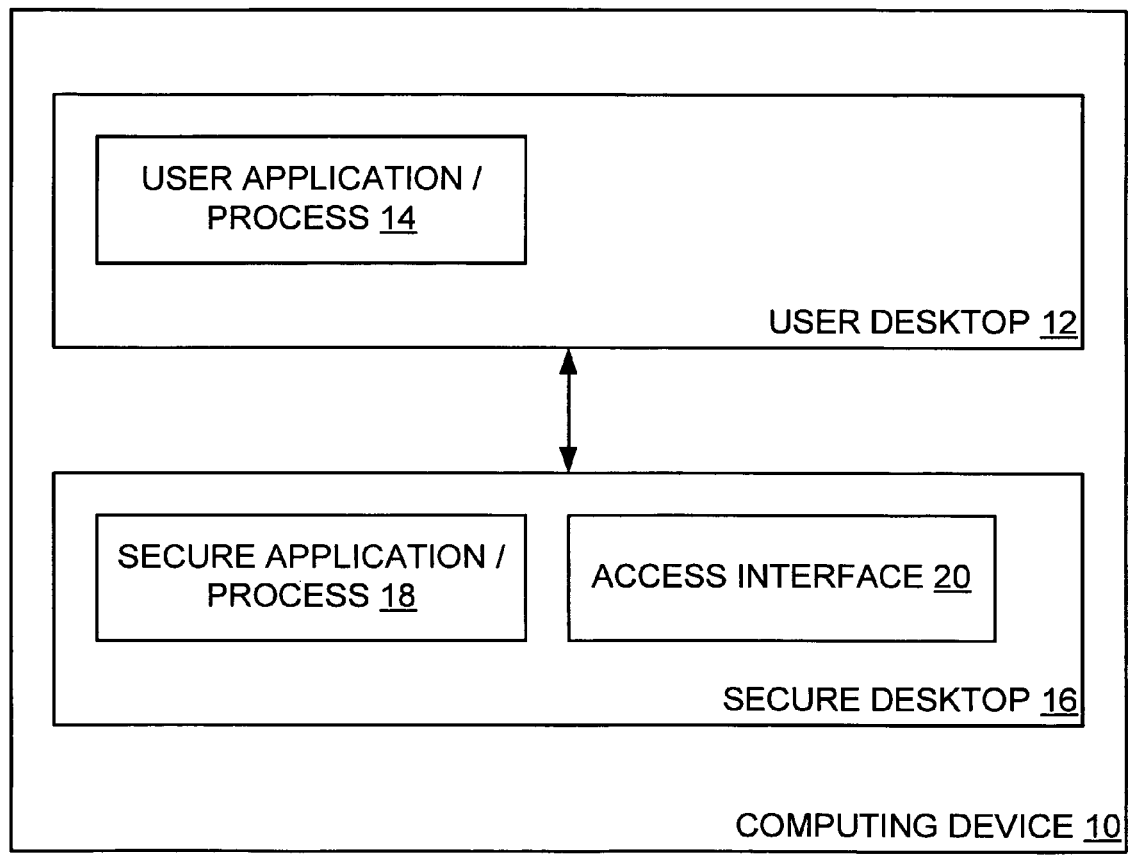
FIG. 2 is a block diagram showing a computing desktop with a user desktop and a secure desktop, where an access interface executes on the secure desktop in accordance with embodiments of the present invention.

In one embodiment of the present invention, and turning now to FIG. 2, a computing device 10 is provided with both a user desktop 12 that is available for executing user processes/applications 14 during the normal course of operation of the computing device 10, and also a secure desktop 16 that is 'elevated' from the user desktop 12 in terms of security and from which more secure system processes/applications 18 may be executed. As may be appreciated, each of the user desktop 12 and the secure desktop 16 may be implemented on the computing device 10 in any appropriate manner without departing from the spirit and scope of the present invention. For example, each desktop 12, 16 may implemented as a sub-system, and each may include software and/or software and hardware.

As was set forth above, the secure desktop 16 only allows a secure application 18 to be executed therefrom and not a user application 14, and only if the secure application 18 is recognized by the secure desktop 16 as being trustworthy. Typically, although not necessarily, the secure desktop 16 is employed by way of secure applications 18 thereof to perform more secure system functions for the computing device 10 that are sensitive in nature, such as for example setting passwords, setting security settings, performing access decisions, and other acts of a sensitive nature in terms of security and/or trustworthiness or the like. Thus, a secure application 18 is typically although not necessarily a system process being performed by or on behalf of an operating system of the computing device. Correspondingly, the user desktop 12 is employed by way of user applications 14 thereof to perform most if not all other typical computing functions.

Typically, a secure application 18 shows trustworthiness by proffering a digital certificate or other proffering device from a source that is recognized by the secure desktop 16 as being trustworthy, although other method of showing trustworthiness may be employed without departing from the spirit and scope of the present invention. Thus, the secure desktop 16 allows a secure application 18 to be run thereon only after the application 18 has been established as being trustworthy, and if the trustworthy application 18 satisfies any other policy that the secure desktop 16 enforces. As was noted above, such a secure desktop 16 is disclosed more fully in U.S. patent application Ser. No. 11/251,946, filed Oct. 17, 2005 and hereby incorporated by reference in its entirety.

Access Interface

Typically, the secure desktop 16 is reached from the user desktop 12 by way of a call or the like from a user application 14 or the like on the user desktop 12 to a secure application 18 or the like on the secure desktop 16. Thus, the secure application 18 is to perform a secure or sensitive act, service, or operation or the like on behalf of the user application 14, such as for example receiving sensitive information, accessing a cryptographic key, determining policy for a sensitive manner, assigning a higher privilege to a user or an application, etc. In response to the call, and particularly with regard to the present invention, a user at the computing device 10 may first be prompted by way of an access interface 20 to confirm or deny that the secure application 18 or the like can perform the act at the secure desktop 16. Thus, with the access interface 20, the user may be required to enter a credential such as a password, or may be asked to input a confirmatory selection such as a selection from a cursor on a visual button.

Notably, and as was set forth above, the user at the computing device 10 is being asked at the access interface 20 to make a good decision on when to allow or deny a secure application 18 to perform some sensitive act on the secure desktop 16. Thus, the access interface 20 should itself be secure so as to provide the user with reliable information and to collect reliable information from the user. That is, the access interface 20 should not be susceptible to a malicious attack by a nefarious entity or the like by which the computing device 10 and the secure desktop 16 thereof are exposed to improper access.

In particular, the access interface 20 should not be vulnerable to attack by way of altering inputs to such access interface 20. That is, the access interface 20 should not be susceptible to alteration or 'spoofing' such that a user believes that he or she is selecting to deny a sensitive act at the secure desktop 16 but is instead and in reality allowing such sensitive act. Accordingly, and in one embodiment of the present invention, the access interface 20 for accessing the secure desktop 16 is made not susceptible to an interface spoofing attack by being executed on the secure desktop 16 itself.

In particular, in the present invention, the access interface 20 is rendered on the secure desktop 16 and thus such secure desktop 16 guarantees that the user is experiencing and acting upon a non-spoofed access interface 16, and also guarantees that each input as received from the user maintains fidelity with the intent of such user. That is, if the user intends to deny a sensitive act at such secure desktop 16 with regard to a user application 14 calling from the user desktop 12, then such denial will be noted by the secure desktop 16 and acted upon so as to in fact deny such act.

Notably, by executing the access interface 20 on the secure desktop 16, such access interface 20 is inherently trustworthy and thus provides a high degree of integrity in order to provide the user with as much factual information with which he or she can make a critical decision. By extension, such access interface 20 can also be applied to other operating system functions on the computing device 10 to increase overall security with regard thereto, including user account provisioning and management, credential management, and the like.

Note, though, that by interposing the access interface 20 between a user application 14 executing on the user desktop 12 and a secure application 18 executing on the secure desktop 16, such access interface 20 in effect disrupts the normal flow and use of the computing device 10 as expected by the user. Put simply, such access interface 20 although beneficial is nevertheless another item that the user must deal with in a serialized and modal fashion.

Visually Presenting the Access Interface 20

In one embodiment of the present invention, then, the introduction and presence of the access interface 18, and particularly the visual presentation of the access interface 20, is effectuated in a manner so as to be aesthetically pleasing and harmonious to the user. Thus, jolting or shocking that may be experienced by the user upon the sudden and perhaps unexpected visual presence of such access interface 20 is minimized if not eliminated.

Principally, and in one embodiment of the present invention, such an aesthetically pleasing and harmonious introduction is achieved by visually presenting the access interface 20 within the context of and in conjunction with the calling user application 14. Thus, the access interface 20 is visually coupled to the user application 14 and is visually perceived by the user in the context of such user application 14, all in a more pleasing manner.

Figure 3:
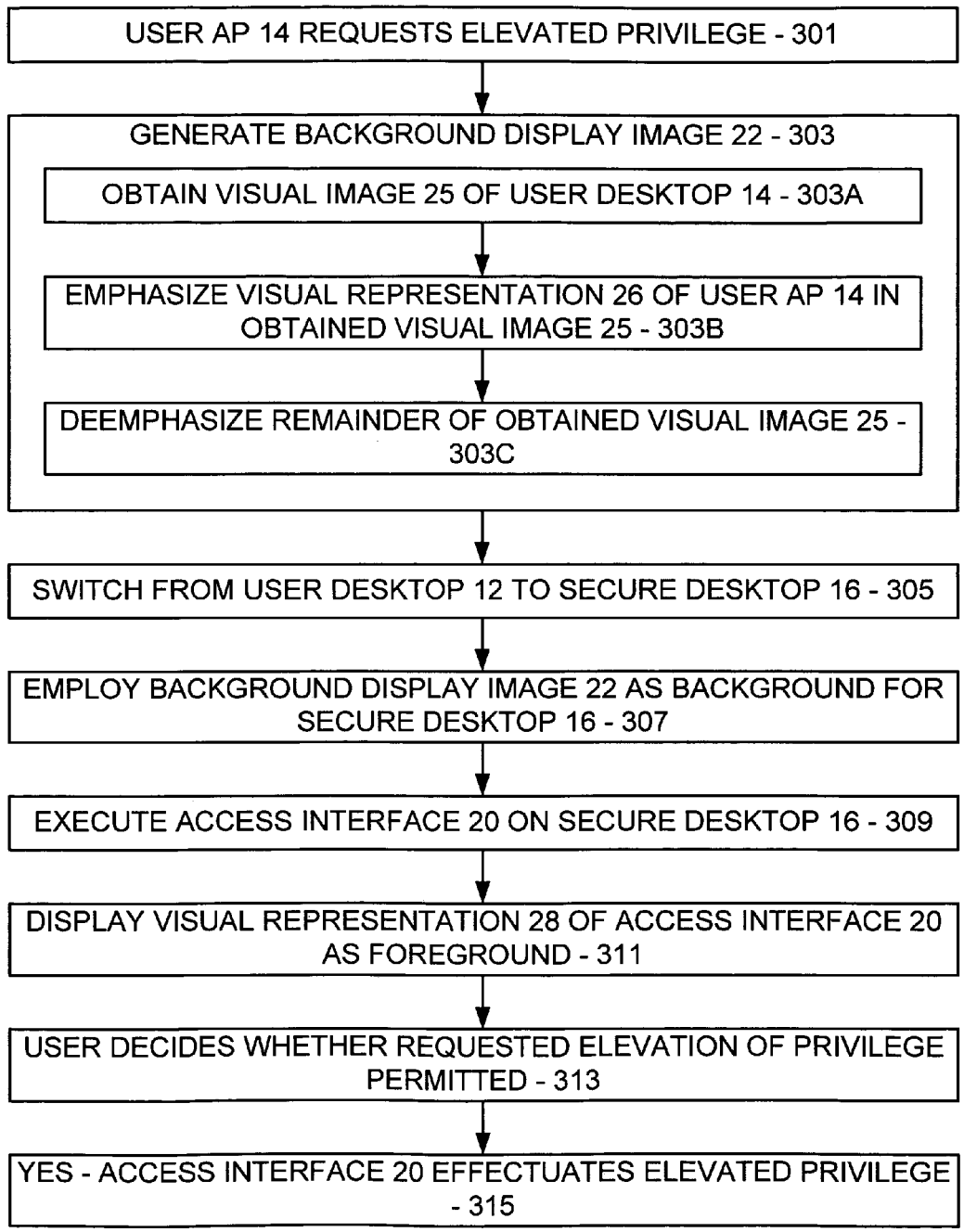
FIG. 3 is a flow diagram showing key steps performed in conjunction with the user desktop, secure desktop, and access interface of FIG. 2 in accordance with embodiments of the present invention.

Turning now to FIG. 3, it is seen that in one embodiment of the present invention, the access interface 20 is visually presented and otherwise effectuated in the following manner. Preliminarily, a user application 14 or the like on the user desktop 12 of the computing device 10 is operating and in the course thereof requests a sensitive act such as for example an elevated privilege such as may be achieved by way of a secure application 18 or the like on the secure desktop 16 of the computing device 10 (step 301). As should be appreciated, the user application 14, the sensitive act/elevated privilege, and the secure application 18 may be any user application 14, sensitive act/elevated privilege, and secure application 18 without departing from the spirit and scope of the present invention.

At any rate, the request for the sensitive act (hereinafter, the elevation request) from the user application 14 is detected by an appropriate part of the operating system of the computing device, and in response thereto the access interface 20 is executed on the secure desktop 16. Note here that although the secure desktop 16 is available for having the access interface 20 executed thereon, Such secure desktop 16 is not likewise available for whatever secure application 18 is necessary to provide the elevated privilege, at least until the access interface 20 determines that the secure desktop 16 can do so.

Presumably, the access interface 20 performs whatever functions are necessary to gather permission from the user to in fact elevate the privilege as was requested by the user application 14. Most relevant to the present invention, and as was set forth above, the access interface 20 is visually presented as being visually coupled to the user application 14 so as to be pleasingly visually perceived by the user in the context of such user application 14.

Figure 4:
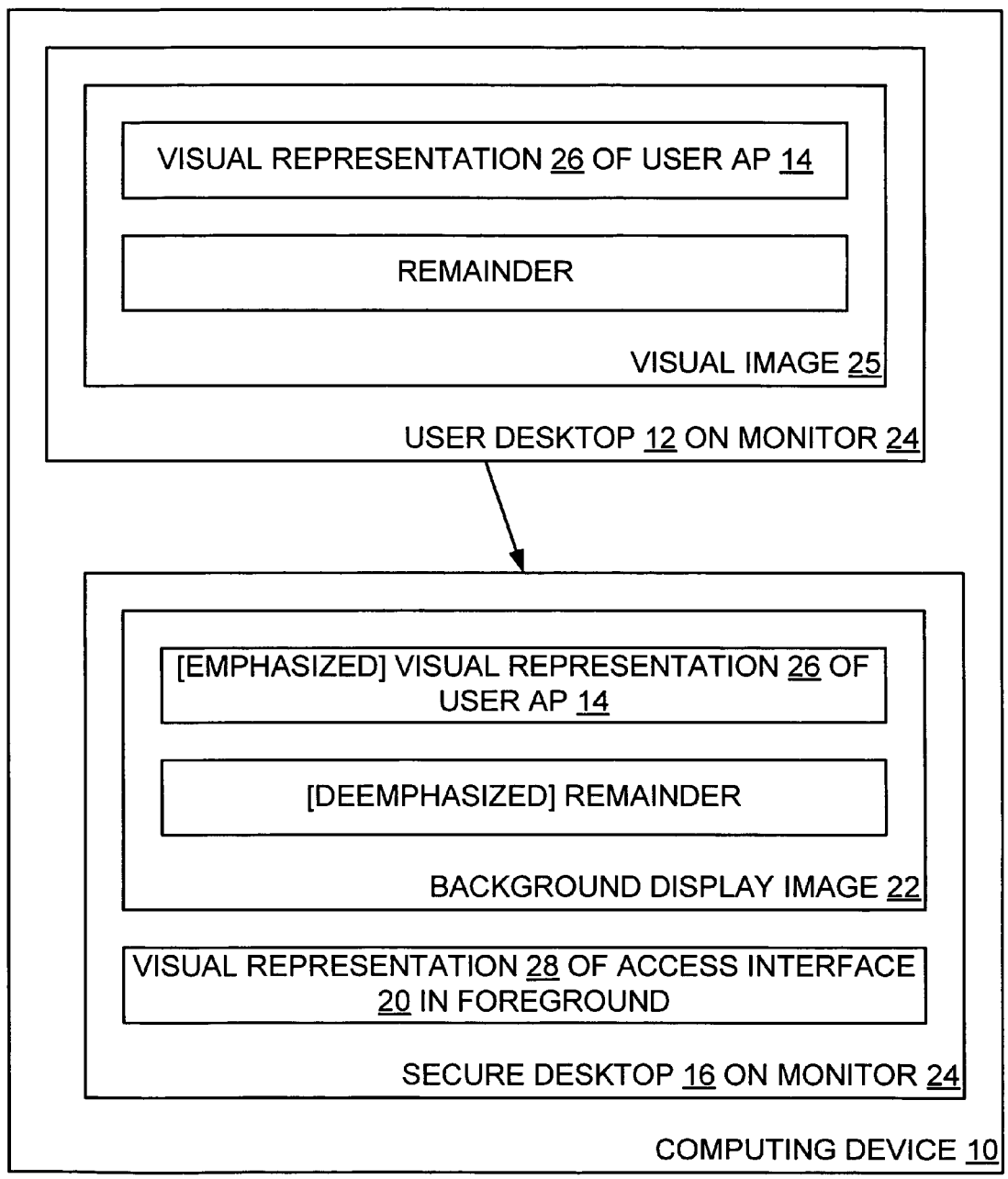
FIG. 4 is a block diagram showing a visual representation of the access interface in a foreground of the secure desktop of FIG. 2 along with a visual representation of a requesting user application from the user desktop in the background of the secure desktop of FIG. 2 in accordance with embodiments of the present invention.

Thus, prior to switching from the user desktop 12 to the secure desktop 16 on which the access interface 20 is executed, and thus prior to executing the access interface 20, and referring also to FIG. 4, an appropriate helper application or the like in the operating system of the computing device 10 generates a background display image 22 to be employed in conjunction with the access interface 20 (step 303), where the background display image 22 is displayed as background on a monitor 24 or other visual display of the computing device 10 while the access interface 20 is visually presented in a foreground of such monitor 24. Note that the helper application may be any appropriate helper application without departing from the present invention. Such a helper application should at least be apparent based on the disclosure set forth herein, and therefore need not be set forth in any detail other than that which is provided.

In particular, and in one embodiment of the present invention, the helper application first obtains a visual image 25 of the user desktop 14, such as at least a portion of the visual image 25 that is displayed on the monitor 24 of the computing device 10 (step 303a). Typically, such visual image 25 is obtained substantially contemporaneously with respect to the time at which the user application 14 requests the elevated privilege as at step 301. Thus, the visual image 25 should include a visual representation 26 associated with the user application 14. More generally, the visual image 25 may be a 'snapshot' of that which is displayed on the monitor 24, and thus may include the visual representation 26 of the user application 14, any operating system elements shown, such as for example a task bar, and other elements shown, such as for example visual representations of other applications and the like.

As may be appreciated, the background display image 22 as generated by the helper application is based on the visual image 25 as obtained at step 303a. While such background display image 22 may indeed be the visual image 25, such visual image 25 may also be altered in any appropriate manner to generate the background display image 22 without departing from the spirit and scope of the present invention. For example, it has been found that to enhance the visual coupling of the access interface 20 with the user application 14, the background display image 22 should emphasize the visual representation 26 of the user application 14 as shown in the visual image 25 obtained at step 303a, and also should deemphasize the remainder of such visual image 25.

Accordingly, and in one embodiment of the present invention, the helper application modifies the obtained visual image 25 to produce the background display image 22 by in fact emphasizing the visual representation 26 of the user application 14 as shown in the obtained visual image 25 (step 303b), and by in fact deemphasizing the remainder of such obtained visual image 25 (step 303c). As may be appreciated, such emphasizing and deemphasizing may be performed in any appropriate manner without departing from the spirit and scope of the present invention. For example, the deemphasizing may be achieved by dimming brightness or by graying, while the emphasizing may be achieved by not dimming brightness or by not graying, by enhancing brightness, or the like. Note that the helper application may locate the visual representation 26 of the user application 14 within the visual image 25 in any appropriate manner without departing from the spirit and scope of the present invention. For example, such location information may be obtained from a graphics sub-system of the computing device 10.

Once the helper application is finished modifying the obtained visual image 25 to produce the background display image 22 by emphasizing and deemphasizing as at steps 303b and 303c, and also by performing any other desired modifications, the finished background display image 22 is then stored in an appropriate location, and the computing device 10 is then automatically switched from the user desktop 12 to the secure desktop 16 (step 305). Such automatic switching may be performed in any appropriate manner without departing from the spirit and scope of the present invention.

Significantly, with the secure desktop 16 in operation, the stored background display image 22 is retrieved and employed as the background for the secure desktop 16 on the monitor 24 (step 307), the access interface 20 is executed on the secure desktop 16 (step 309), and in conjunction therewith a visual representation 28 of the access interface 20 is displayed as the foreground on the monitor 24 (step 311). Note here that the visual representation 28 of the access interface 20 may be any appropriate representation with any appropriate content without departing from the spirit and scope of the present invention. For example, the visual representation 28 may be a box or a pane within which is information relating to the requested elevation of privilege. Such information may for example describe the nature of the requested elevation of privilege, and may require approval from the user to proceed, or may even require that the user take additional steps as may be appropriate. Note too that inasmuch as the background of the secure desktop 16 is the retrieved image 22, such background can only be displayed, and items in the background cannot be selected, executed, or otherwise operated on. Put simply, then, only the visual representation 28 of the access interface 20 in the foreground of the secure desktop 16 is active, and the access interface 20 must be dealt with to proceeding.

Notably, with the visual representation 28 of the access interface 20 in the foreground of the monitor 24 and the background display image 22 in the background of the monitor 24, where the background display image includes the (emphasized) visual representation 26 of the calling user application 14, the access interface 20 is presented to the user in an aesthetically pleasing and harmonious manner to the user, and particularly within the context of or at least in conjunction with the calling user application 14. Thus, and again, the present invention visually couples the access interface 20 to the user application 14 such that the access interface 20 is visually perceived by the user in the context of such user application 14, all in a more pleasing manner.

At any rate, based at least in part on the visual representation 28 of the access interface 20, the user decides whether such requested elevation of privilege is permitted (step 313), and if permitted the access interface 20 effectuates such elevated privilege at the secure desktop 16 (step 315). Additionally, the access interface 20 may communicate to the requesting user application 14 whether the requested elevation of privilege has been approved, and the requesting user application 14 may then proceed in an appropriate manner.

Significantly, based on the fact that the access interface 20 is executing on the secure desktop 16, proper execution of the access interface 20 is guaranteed. Thus, the access interface 20 cannot be spoofed, and the user can be assured that whatever decision he or she has made on requested elevation of privileges is in fact effectuated.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism to render and present a visual representation 28 of an access interface 20 for performing a sensitive act at a secure desktop 16 from a user desktop 12, where the access interface 20 is not susceptible to an interface spoofing attack. The secure desktop 16 itself presents the access interface 20 to the user in an aesthetically pleasing and expected manner such that the user is not surprised by the presence of the interface 20 and can be expected to make a good decision regarding whether to allow a secure application 18 to be run at the secure desktop 16 to elevate a privilege or perform another sensitive act.

It should be appreciated that changes could be made to the embodiments described above without departing from the inventive concepts thereof. As but one example, although the present invention is primarily set forth in terms of collecting consent from a user to effectuate an elevated privilege, the method and mechanism of the present invention may also be employed to securely collect and act on any sort of information. Thus, and as an example, the access interface 20 as executed on the secure desktop 16 and displayed in the present invention may be employed to securely collect payment information when purchasing an item, or may be employed to securely collect log-in information when accessing a privileged area. It should be understood, therefore, that this invention is not limited to the particular embodiments disclosed, but it is intended to cover modifications within the spirit and scope of the present invention as defined by the appended claims.

The invention claimed is:

1. A method with regard to a computing device having a user desktop on which a relatively less-secure user application is executed during normal operation of the computing device, and also having a secure desktop instantiated as a system level process by the operating system and having a security level elevated from a security level of the user desktop on which a relatively more-secure secure application is executed upon a request thereto from the user application, the method for securely collecting information from a user at the computing device with regard to the secure application at the secure desktop, and comprising:

accessing the secure desktop using an access interface executing on the secure desktop of the computing device to securely collect the information from the user;

receiving the request from the user application on the user desktop and in response thereto generating a background display image including a visual representation of the user application;

visually presenting the access interface on the secure desktop in conjunction with the requesting user application of the user desktop such that the access interface is visually coupled to the requesting user application and is visually perceived by the user along with such requesting user application, further comprising:

automatically switching the computing device from the user desktop to the secure desktop after the background display image has been generated; and after switching to a secure desktop:

executing the access interface on the secure desktop and in conjunction therewith securely displaying a visual representation of the access interface in a foreground on the secure desktop on the monitor, the visual representation of the access interface including one or more prompts for securely collecting the information from the user, whereby the visual representation of the access interface is in the foreground of the monitor and the visual representation of the requesting user application is in the background display image in the background of the monitor such that the access interface is visually coupled to the requesting user application and is visually perceived by the user along with such requesting user application.

2. The method of claim 1 for securely collecting information from the user at the computing device including collecting information for one of setting a password, setting a security setting, performing an access decision, receiving sensitive information, accessing a cryptographic key, determining policy for a sensitive manner, and assigning a privilege to a user or an application.

3. The method of claim 1 for securely collecting information from the user at the computing device including collecting information including at least one of a credential and a confirmatory selection.

4. The method of claim 1 wherein generating the background display image includes obtaining a visual image of the user desktop including the visual representation of the user application and producing the background display image based on the obtained visual image.

5. The method of claim 4 wherein generating the background display image includes obtaining a visual image of the user desktop substantially contemporaneously with respect to the request from the user application.

6. The method of claim 4 wherein the visual image of the user desktop includes the visual representation of the user application and other elements, and wherein producing the background display image based on the obtained visual image comprises emphasizing the visual representation of the user application in the obtained visual image and de-emphasizing the other elements of such obtained visual image.

7. The method of claim 6 wherein emphasizing the visual representation of the user application in the obtained visual image comprises brightening the visual representation.

8. The method of claim 6 wherein de-emphasizing the other elements of the obtained visual image comprises at least one of dimming the other elements and graying the other elements.

9. The method of claim 1 comprising employing the generated background display image as the background of the secure desktop on the monitor such that items in the background are for display only and cannot be selected, executed, or operated on.

10. The method of claim 1 further comprising the user securely providing the information to be collected by way of the visual representation of the access interface, and the secure application on the secure desktop acting upon the provided information.

11. The method of claim 1 wherein the information to be collected from the user includes a permission to effectuate a change by way of the secure application, the method further comprising the user securely providing the permission by way of the visual representation of the access interface, and the secure application on the secure desktop effectuating the change only after the user securely provides the permission by way of the visual representation of the access interface.

12. The method of claim 1 further comprising the user securely providing the information to be collected by way of the access interface, and the secure application on the secure desktop acting upon the provided information.

13. The method of claim 1 wherein the information to be collected from the user includes a permission to effectuate a change by way of the secure application, the method further comprising the user securely providing the permission by way of the access interface, and the secure application on the secure desktop effectuating the change only after the user securely provides the permission by way of the access interface.

14. The method of claim 1 further comprising the access interface responding to the requesting user application.

* * * * *